(12) United States Patent
Maretti et al.

(10) Patent No.: US 11,144,646 B2
(45) Date of Patent: Oct. 12, 2021

(54) PROGRAMMABLE HEARING ASSISTIVE DEVICE

(71) Applicant: WIDEX A/S, Lynge (DK)

(72) Inventors: Niels Erik Boelskift Maretti, Birkerod (DK); Anders Westergaard, Herlev (DK)

(73) Assignee: WIDEX A/S, Lynge (DK)

( * ) Notice: Subject to any disclaimer, the term of this patent is extended or adjusted under 35 U.S.C. 154(b) by 436 days.

(21) Appl. No.: 16/276,074

(22) Filed: Feb. 14, 2019

(65) Prior Publication Data

US 2019/0191255 A1   Jun. 20, 2019

Related U.S. Application Data

(63) Continuation of application No. PCT/EP2016/069337, filed on Aug. 15, 2016.

(51) Int. Cl.
*H04R 25/00* (2006.01)
*G06F 21/57* (2013.01)
(Continued)

(52) U.S. Cl.
CPC .......... *G06F 21/572* (2013.01); *G06F 21/105* (2013.01); *G06F 21/629* (2013.01);
(Continued)

(58) Field of Classification Search
CPC .. H04R 25/552; H04R 25/554; H04R 25/558; H04R 25/70; H04R 2225/55;
(Continued)

(56) References Cited

U.S. PATENT DOCUMENTS

| 7,283,842 B2 | 10/2007 | Berg |
| 8,005,232 B2 | 8/2011 | Roeck et al. |

(Continued)

FOREIGN PATENT DOCUMENTS

| EP | 1 628 503 A2 | 2/2006 |
| EP | 2 070 385 A2 | 6/2009 |

(Continued)

OTHER PUBLICATIONS

Written Opinion for PCT/EP2016/069337, dated Oct. 10, 2016.
International Search Report for PCT/EP2016/069337, dated Oct. 10, 2016.

*Primary Examiner* — Robert B Leung
(74) *Attorney, Agent, or Firm* — Sughrue Mion, PLLC

(57) ABSTRACT

A method for programming a hearing assistive device includes requesting write access from a programming device to the hearing assistive device, sending, in response to the request, a first message from the hearing assistive device to a programming-rights-management server, generating, in the programming-rights-management server, a programming rights permission list, sending a second message containing the programming rights permission list from the programming-rights-management server to the hearing assistive device, transferring programming data in a programming session from the programming device to the hearing assistive device, writing the received programming data as control data sets permitted according the programming rights permission list received from the programming-rights-management server, and terminating the programming session once data writing has been completed.

26 Claims, 5 Drawing Sheets

(51) Int. Cl.
*G06F 21/62* (2013.01)
*G06F 21/10* (2013.01)

(52) U.S. Cl.
CPC ......... *H04R 25/552* (2013.01); *H04R 25/554* (2013.01); *H04R 25/558* (2013.01); *H04R 25/70* (2013.01); *G06F 2221/0768* (2013.01); *H04R 2225/55* (2013.01)

(58) Field of Classification Search
CPC .... G06F 21/105; G06F 21/572; G06F 21/629; G06F 2221/0768
See application file for complete search history.

(56) References Cited

U.S. PATENT DOCUMENTS

| | | | |
|---|---|---|---|
| 8,064,609 B2 | 11/2011 | Baechler et al. | |
| 8,166,312 B2 | 4/2012 | Waldmann | |
| 8,503,703 B2 | 8/2013 | Eaton et al. | |
| 8,543,709 B2 | 9/2013 | Platz et al. | |
| 8,767,986 B1 | 7/2014 | Fabry et al. | |
| 9,177,122 B1* | 11/2015 | Trier | G06F 8/65 |
| 9,227,057 B2 | 1/2016 | McElveen, Jr. | |
| 10,510,446 B2* | 12/2019 | Westermann | H04R 25/554 |
| 10,715,934 B2* | 7/2020 | Vendelbo | H04R 25/70 |
| 2008/0165980 A1 | 7/2008 | Pavlovic et al. | |
| 2010/0293609 A1 | 11/2010 | Laasik | |
| 2011/0176686 A1 | 7/2011 | Zaccaria | |
| 2014/0082373 A1* | 3/2014 | Colnot | G06F 21/572 |
| | | | 713/193 |
| 2014/0341405 A1 | 11/2014 | Pedersen et al. | |
| 2015/0010159 A1* | 1/2015 | Tran | H04R 25/558 |
| | | | 381/60 |
| 2015/0289066 A1 | 10/2015 | Pedersen | |
| 2016/0173278 A1 | 6/2016 | Pedersen et al. | |
| 2016/0173462 A1 | 6/2016 | Pedersen et al. | |
| 2016/0173996 A1* | 6/2016 | Edgar | H04R 25/554 |
| | | | 381/314 |
| 2016/0173997 A1* | 6/2016 | Pedersen | H04R 25/00 |
| | | | 381/314 |
| 2016/0212552 A1* | 7/2016 | Schneider | H04L 67/06 |
| 2017/0004290 A1 | 1/2017 | Pedersen et al. | |
| 2017/0005810 A1 | 1/2017 | Pedersen et al. | |
| 2017/0006029 A1 | 1/2017 | Pedersen et al. | |
| 2017/0006389 A1 | 1/2017 | Pedersen et al. | |
| 2017/0006391 A1 | 1/2017 | Pedersen et al. | |
| 2017/0006392 A1 | 1/2017 | Pedersen et al. | |
| 2017/0006024 A1 | 4/2017 | Pedersen et al. | |
| 2018/0167368 A1 | 6/2018 | Vendelbo | |
| 2018/0167746 A1 | 6/2018 | Vendelbo | |
| 2018/0167748 A1 | 6/2018 | Vendelbo | |
| 2018/0167749 A1 | 6/2018 | Vendelbo | |
| 2018/0167751 A1 | 6/2018 | Vendelbo | |
| 2018/0167809 A1 | 6/2018 | Vendelbo | |

FOREIGN PATENT DOCUMENTS

| | | |
|---|---|---|
| EP | 3 425 929 A1 | 1/2019 |
| WO | 2011/128462 A2 | 10/2011 |
| WO | 2013/117214 A1 | 8/2013 |
| WO | 2016/078710 A1 | 5/2016 |

* cited by examiner

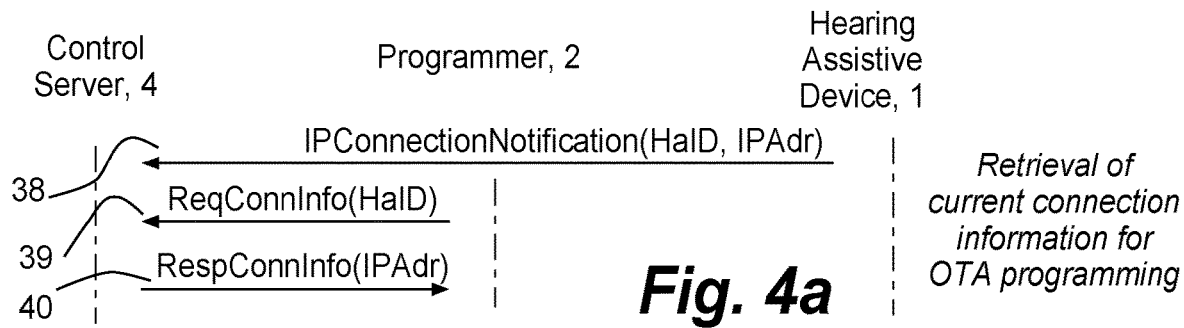
Fig. 4a — Retrieval of current connection information for OTA programming
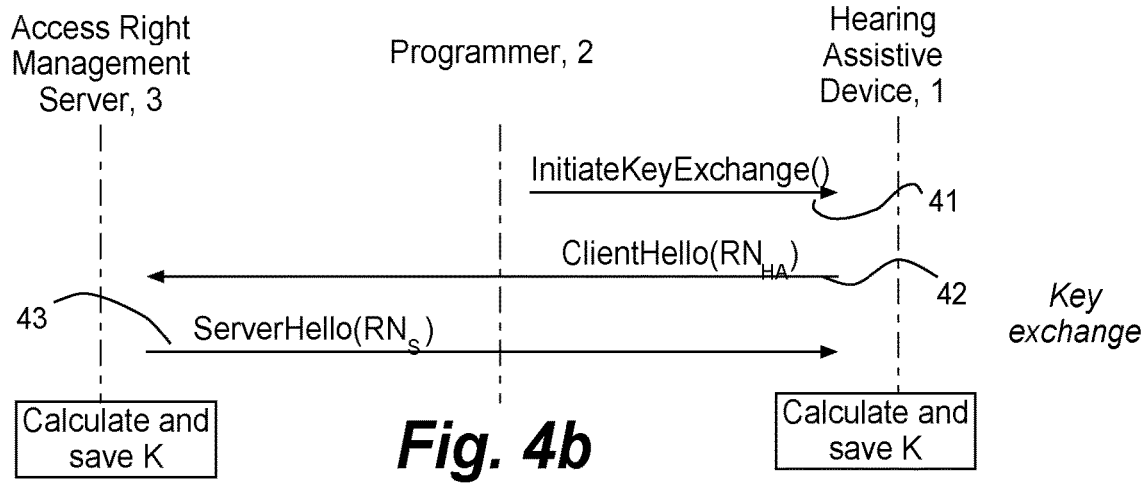
Fig. 4b — Key exchange
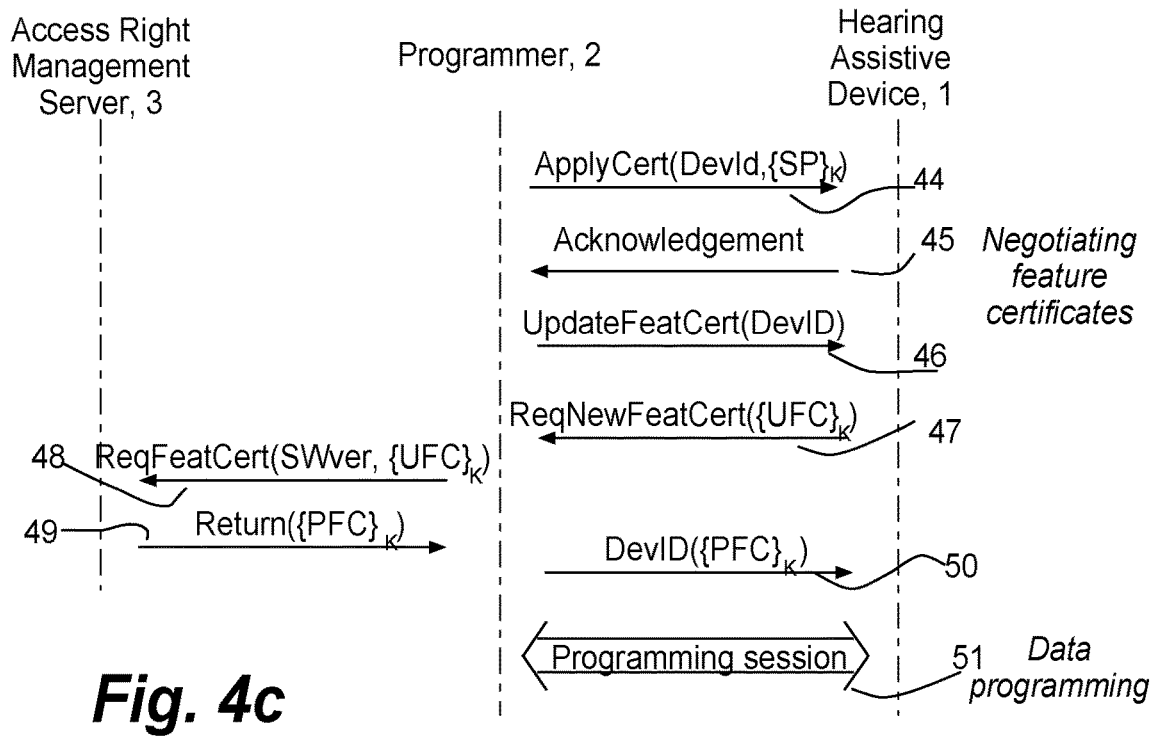
Fig. 4c — Negotiating feature certificates / Data programming

PROGRAMMABLE HEARING ASSISTIVE DEVICE

CROSS-REFERENCE TO RELATED APPLICATION

This application is a continuation of International Application PCT/EP2016/069337, filed Aug. 15, 2016, and published as WO2018033196 A1 on Feb. 22, 2018; the prior application is herewith incorporated by reference in its entirety.

BACKGROUND OF THE INVENTION

The present invention relates to hearing assistive devices. The invention, more particularly, relates to a method for ensuring that a hearing assistive device is only open for operations approved by a programming manager. Also, the invention relates to a programming system for programming a hearing assistive device.

Hearing aid manufacturing companies design, develop and manufacture hearing instruments for distribution by independent, credentialed, licensed hearing health care professionals providing service and support for hearing impaired customers in compliance with all applicable state, federal and professional regulations and law.

As more and more services and features are added to the hearing instruments or hearing assistive devices, and the connectivity of the hearing assistive devices improves, the need for prohibiting un-authorized programming of the hearing assistive devices increases.

Un-authorized programming of the hearing assistive devices of the control parameters of the hearing assistive device for alleviating a hearing loss by personalized amplification may harm the users residual hearing if not carried out under supervision of an audiologist or a hearing care professional. Furthermore, un-authorized programming of control parameters controlling the overall architecture of the hearing assistive device may result in un-authorized upgrading of hearing assistive devices or un-authorized activation of features intended for subscription, and thereby harm the profit of the manufacturer.

SUMMARY OF THE INVENTION

The purpose of the invention is to provide a method for controlling that the programming of a hearing assistive device is only possible for operations approved by a programming-rights-management server.

This purpose is according to the invention achieved by a method for programming a hearing assistive device, and including requesting write access from a programming device to the hearing assistive device; sending, in response to the request, a first message from the hearing assistive device to a programming-rights-management server; generating, in the programming-rights-management server, a programming rights permission list; sending a second message containing the programming rights permission list from the programming-rights-management server to the hearing assistive device; transferring programming data in a programming session from the programming device to the hearing assistive device; writing the received programming data as control data sets permitted according the programming rights permission list received from the programming-rights-management server; and terminating programming session when data writing has been completed.

Hereby access to registers and/or an EEPROM may only take place when the access has been whitelisted from the programming-rights-management server.

According to a second aspect of the invention there is provided a hearing assistive device having a programming interface providing secure access to programming data stored in the hearing assistive device and a communication manager managing communication over a wireless connection, wherein the communication manager, when receiving a write access request from a programming device, sends a first message to a programming-rights-management server. The communication manager sets up a programming session with the programming device based upon the programming rights permission list when receiving a second message containing a programming rights permission list from the programming-rights-management server in response to the message sent. The the communication manager terminates the programming session when data writing has been completed.

According to a third aspect of the invention there is provided a programming system for programming a hearing assistive device and including a programming device and a programming-rights-management server. The programming device is adapted to initiate a programming session by requesting write access to the hearing assistive device, and the hearing assistive device is adapted to send a first message, in response to the request, to the programming-rights-management server. The programming-rights-management server is adapted to generate a programming rights permission list, and to send the programming rights permission list in a second message to the hearing assistive device; and the programming device is adapted to transfer programming data in the programming session to the hearing assistive device, the hearing assistive device is adapted to write the received programming data as control data sets permitted according the programming rights permission list received from the programming-rights-management server. The programming device is adapted to terminate the programming session when data writing has been completed.

A fourth aspect of the invention is based upon the use of a secure session established by means of a set of private keys held by a programming-rights-management server and a hearing assistive device, for communicating the access rights for a programming device from the programming-rights-management server to the hearing assistive device.

BRIEF DESCRIPTION OF THE DRAWINGS

The invention will be described in further detail with reference to preferred aspects and the accompanying drawing, in which:

FIG. 4a, FIG. 4b, and FIG. 4c, illustrate the messaging structure when programming the hearing assistive device according to one aspect of the invention;

DETAILED DESCRIPTION OF THE INVENTION

Figure 1:
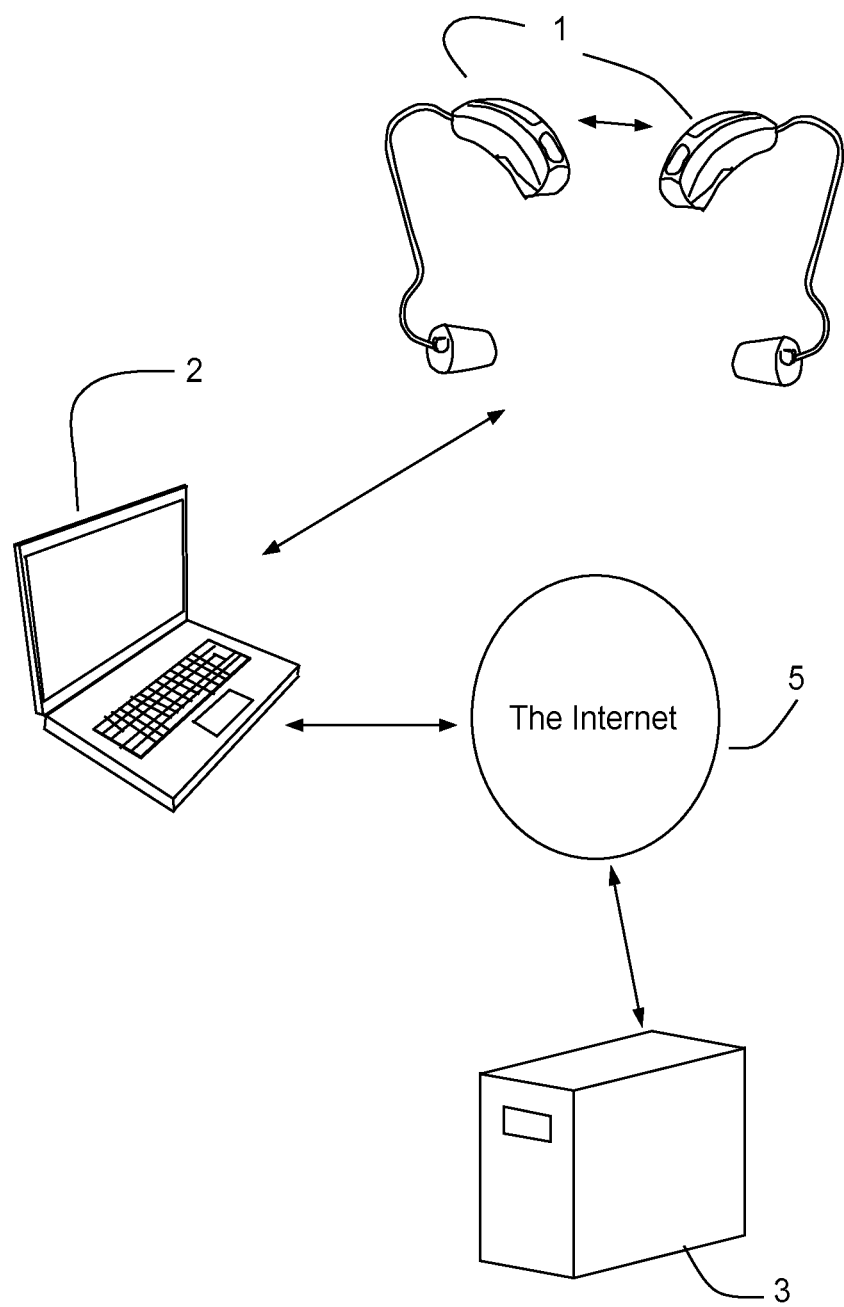
FIG. 1 illustrates schematically a programming system for programming a hearing assistive device according to a first embodiment of the invention.

Reference is made to FIG. 1, which schematically illustrates a programming system for programming a hearing assistive device according to a first embodiment of the invention. Prior to use, the settings of the hearing aid are set and adjusted by a hearing care professional according to a prescription. The prescription is provided by an audiologist and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

The programming system according to the invention ensures that a programming device 2, e.g. operated by a hearing care professional or an audiologist, is allowed to set control data of a hearing assistive device, e.g. a hearing assistive device 1, according to access rights permissions managed by programming-rights-management server 3. In addition to settings for alleviating a hearing loss, the programming device 2 may also be used to adjust the operation of the hearing assistive device 1, which may affect the price point (sales price) of the hearing assistive device 1, and control add on service features for timed subscription.

FIG. 1 shows two hearing aids 1 providing a set of binaural hearing aids. The set of binaural hearing aids 1 may each have a low power inductive radio providing an inter-ear communication channel, e.g. via a proprietary communication protocol, and a short-range radio providing connection to other devices. Preferably, the short-range radio may be based upon the Bluetooth™ Low Energy protocol as most smartphones and computers supports Bluetooth™ Low Energy; marketed as Bluetooth™ Smart and specified in the Bluetooth Core Specification Version 4.0 and later versions.

The two hearing aids 1 are illustrated as Behind-The-Ear hearing aids having customized ear plugs. However, the invention is applicable for any type of hearing aid having a short-range radio providing connection to other devices.

When a hearing care professional or an audiologist starts programming (in-clinic fitting) the hearing assistive device 1 according to an embodiment of the invention, the hearing care professional operates a fitting program on an Internet-enabled programming device 2; which may be a standard laptop computer. When connected to the hearing assistive device 1, the programming device 2 sends a write access request message to the hearing assistive device 1. In response to the write access request from the programming device 2, the hearing assistive device 1 establishes a secure session with programming-rights-management server 3 by means of a set of private keys held by the programming-rights-management server 3 and the hearing assistive device 1. The set of private keys is used for encrypting the messages exchanged between the programming-rights-management server 3 and the hearing assistive device 1. In the embodiment shown in FIG. 1, the programming-rights-management server 3 and the hearing assistive device 1 exchanges messages via the programming device 2 and the Internet 5. The messaging is secure due to the encryption and no one not having the private keys may compromise the communication. By applying Transport Layer Security (TLS) or Secure Sockets Layer (SSL), communications security has been provided over the Internet 5 by means of cryptographic protocols.

Prior to the secure session, the hearing assistive device 1 identifies itself for the programming-rights-management server 3 and asks the programming-rights-management server 3 to become informed about the operations the programming device 2 is permitted to carry out on the hearing assistive device 1. The programming-rights-management server 3 responds by creating and sending a programming rights permission list containing a whitelist of memory addresses with associated access rights for the programming device 2 in question. Preferably the access rights are valid for one programming session only.

Once the programming rights permission list has been received at the hearing assistive device 1, the hearing assistive device 1 allows the programming device 2 to establish a programming session during which programming data are transferred from the programming device 2 to the hearing assistive device 1 for being written as control data sets permitted according the access rights received from the programming-rights-management server 3. The programming session is terminated once the data writing has been completed.

Figure 2:
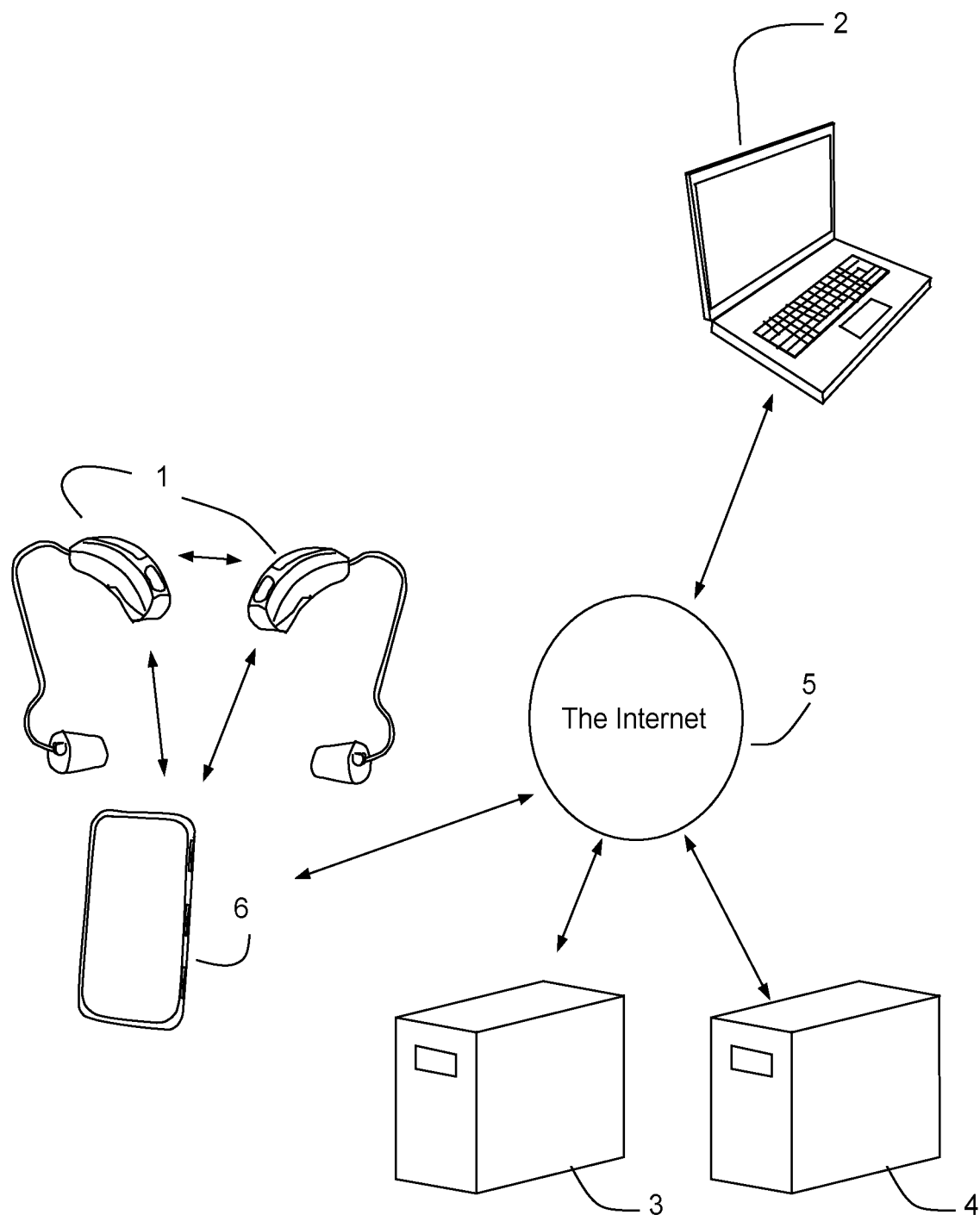
FIG. 2 illustrates schematically a programming system for programming a hearing assistive device according to a second embodiment of the invention.

FIG. 2 illustrates schematically a programming system for programming a hearing assistive device 1 according to a second embodiment of the invention. Binaural hearing assistive devices 1 are similar to the set of hearing assistive devices 1 discussed with reference to FIG. 1 but have in this embodiment been paired with a personal communication device 6. The Bluetooth™ connection between the paired devices provides an encrypted communication link. The hearing assistive device 1 and the personal communication device 6 communicates a via Bluetooth™ Low Energy communication link as explained above, and the personal communication device 6 acts as a gateway to the Internet 5 for the hearing assistive device 1. The personal communication device 6 may be a smartphone, a laptop computer or a tablet computer, and its only function during the programming session is to act as a gateway to the Internet 5 for the hearing assistive device 1.

When the hearing care professional or the audiologist starts a programming session (remote fitting) with the hearing assistive device 1, the hearing care professional operates a fitting program on an Internet-enabled programming device (e.g. a standard laptop computer) 2. As there is in this embodiment no direct contact between the hearing assistive device 1 and the programming device 2, the programming device 2 has to access the hearing assistive device 1 via the Internet 5 which may be problematic as the hearing assistive device 1 may be a part of a local area network behind a firewall.

Therefore, the hearing assistive device 1 may advantageously communicate a unique identity for the device and its current connection information (IP address and port number) to a control server 4 every time the connection information updates. The control server 4 may be linked to the programming-rights-management server 3 or integrated therein. Hereby the programming device 2 may via the programming-rights-management server 3 obtain current connection information for the hearing assistive device 1, and set up a direct connection, preferably using UDP (User Datagram Protocol) hole punching for establishing a bidirectional UDP connection via the personal communication device 6 acting as gateway.

The program running on the programming device 2 for programming the hearing assistive device 1 starts out identifying the location of the hearing assistive device 1 by providing the unique identity for the device 1 to the control server 4, and retrieving the current connection information (IP address and port number) in response. Based on this connection information, the programming device 2 sends a write access request message to the hearing assistive device 1 using the UDP hole punching technique. Then the hearing assistive device 1 establishes a secure session with programming-rights-management server 3 in order to obtain the programming rights permission list as explained with reference to FIG. 1. Once the hearing assistive device control unit has obtained the programming rights permission list, the programming device 2 is permitted to establish a programming session during which programming data are transferred from the programming device 2 to the hearing assistive device 1 for being written as control data sets permitted according the access rights received from the programming-rights-management server 3. Advantageously the programming session is provided as a secure session based on public key encryption. The programming session is terminated once the data writing has been completed.

Figure 3:
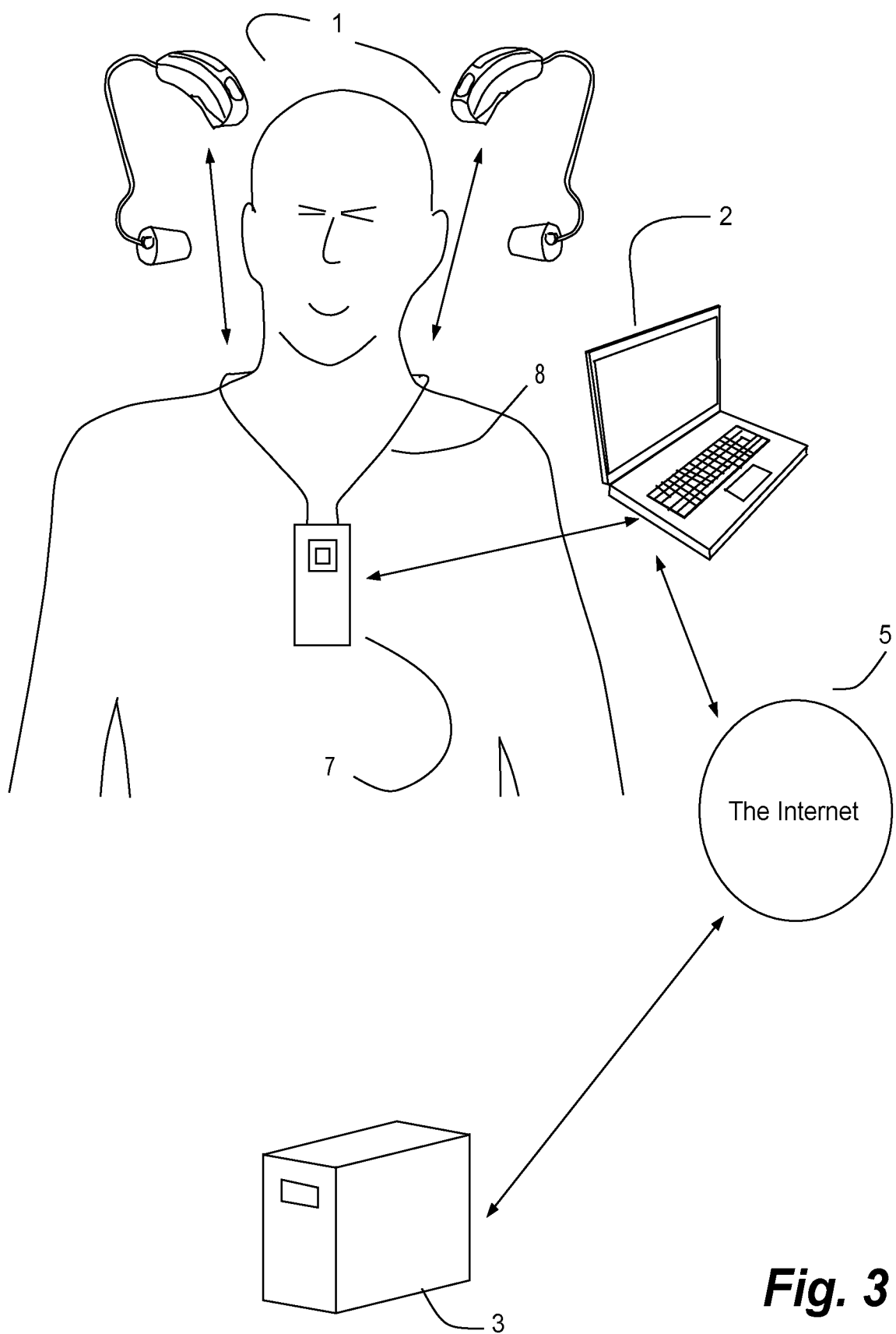
FIG. 3 illustrates schematically a programming system for programming a hearing assistive device according to a third embodiment of the invention.

FIG. 3 shows a fitting or programming scenario where a hearing care professional or an audiologist is programming (in-clinic fitting) the hearing assistive device 1 according to a further embodiment of the invention. The hearing care professional operates a fitting program on an Internet-enabled programming device 2, such as a standard laptop computer. The programming device 2 connects to the hearing assistive device 1 via a bi-directional data streamer 7, e.g. implemented with an antenna element included in a necklace 8. The communication between the programming device 2 and the bi-directional data streamer 7 may be provided by a standard Bluetooth link—e.g. operating according to the Bluetooth Core Specification, version 3.0, and the communication between the hearing assistive devices 1 and the bi-directional data streamer 7 may be provided by a radio channel similar to the low power inductive radio providing an inter-ear communication channel between the hearing assistive devices 1. The bi-directional data streamer 7 translates the data between the two carriers supported, and includes a combined neck-loop and coupling coil for providing an inductive coupling to the hearing assistive devices 1.

The programming device 2 sends a write access request message to the hearing assistive device 1 via the bi-directional data streamer 7. In response to write the access request, the hearing assistive device 1 establishes a secure session with programming-rights-management server 3 during which it receives the programming rights permission list. When the programming rights permission list has been received, the hearing assistive device 1 allows the programming device 2 to establish a programming session via the bi-directional data streamer 7, and the programming session is terminated once the data writing has been completed.

FIG. 4a, FIG. 4b, and FIG. 4c illustrates the messaging structure between the programming device 2, the hearing assistive device 1, and the programming-rights-management server 3 according to one aspect of the invention.

For the remote fitting embodiment shown in FIG. 2, the hearing care professional may, as shown in FIG. 4a, retrieve the current connection information for the hearing assistive devices 1 to be programmed.

The hearing assistive device 1 sends its current connection information in an IPConnectionNotification(Haid, IPAdr) message 38 to the control server 4 when trigged by an event, e.g. a connection being established via a gateway to the Internet. Hereby the control server 4 is able to maintain a connection register for Internet enabled hearing assistive devices 1 as a look-up table in which the unique identity for a hearing assistive device 1 may be translated to its current connection information.

Therefore, the hearing care professional enters the unique identity for each of the hearing assistive devices 1 into the programming device 2, and the programming device 2 sends a ReqConnInfo(HaID) message 39 to the control server 4 requesting the current connection data for each of the hearing assistive devices 1 to be programmed, the message including the unique identity HaID of the hearing assistive device 1. In this embodiment, a second ReqConnInfo(HaID) message 39 (not shown) is sent for the other hearing assistive device 1 if the set includes two hearing assistive devices 1. The control server 4 checks the current address in a look-up table and sends a RespConnInfo(IPAdr) message 40 containing the current connection information, e.g. IP address and port number for the hearing assistive device 1, to the programming device 2.

The hearing assistive device 1 does according to some embodiments have security elements embedded to a non-editable memory. The hearing assistive device 1 and the programming-rights-management server 3 do hold a Pre-Shared Key (PSK) or private keys. The Pre-Shared Key (PSK) may be identical or there may be a simple and unambiguous transformation starting from the two keys.

In practice, the keys represent a pre-shared secret between the two parties that can be used to set up a private information link prior to a secure session. In order to keep the Pre-Shared Key (PSK) secure, the keys are not used directly. The hearing assistive device 1 has its own security elements including the private key (pre-shared secret), preferably stored as an OTP (One Time Programmable) key, and the programming-rights-management server 3 may access the same private key by a simple look up in a hearing device database based on the unique identity, HaID, of the hearing assistive device 1. The OTP key is programmed during manufacturing of the hearing assistive device 1, and is unique for each device and the key can be placed on the server enabling the usage of pre-shared key algorithms.

Then the programming device 2 has to be connected to the hearing assistive device 1 to be programmed; either in a remote fitting session via the Internet 5 and an appropriate gateway (the personal communication device 6) or in a fitting session based on a short-range radio channel. When the connection is in place, the programming device 2 sends an InitiateKeyExchange( )message 41 to the hearing assistive device 1 in order to establish a secure connection between the hearing assistive device 1 and the access rights management server 3, which will be explained with reference to FIG. 4b.

In response to the received InitiateKeyExchange( ) message 41, the hearing assistive device 1 generates a random number $RN_{HA}$. The hearing assistive device 1 sends a ChentHello($RN_{HA}$) message 42 containing the random number $RN_{HA}$, and the unique identity, HaID, of the hearing assistive device 1. The ClientHello($RN_{HA}$) message 42 is sent to the programming-rights-management server 3, preferably based on an Internet address stored in the hearing assistive device 1. When sending the message 42, the hearing assistive device 1 is using the programming device 2 or the personal communication device 6 for providing a gateway to the Internet 5. The programming device 2 or the personal communication device 6 just relays the ClientHello ($RN_{HA}$) message 42.

Once the ClientHello($RN_{HA}$) message 42 has been received at the programming-rights-management server 3, the programming-rights-management server 3 identifies the hearing assistive device 1 based upon its unique identity, HaID, and extracts, and stores its random number $RN_{HA}$. The programming-rights-management server 3 then generates a random number, $RN_S$, based on security elements associated with the hearing assistive device 1, including the private key. The programming-rights-management server 3 sends a ServerHello($RN_S$) message 43 containing the random number $RN_S$ to the hearing assistive device 1. Again the programming device 2 or the personal communication device 6 used as gateway to the Internet 5 is just relaying the ServerHello($RN_S$) message 43.

The purpose of using the random numbers, $RN_{HA}$ and $RN_S$, is that the receiving device may verify that the transmitted random numbers, $RN_{HA}$ and $RN_S$, have been calculated based on the Pre-Shared Key (PSK) associated with the hearing assistive device 1 and thereby verify the messages 42 and 43 as being authentic.

Furthermore, a master-secret (K) is calculated and saved. The master-secret (K) is subsequently used in the actual cryptographic operations. The master-secret (K) is calculated unambiguously by using an algorithm having the Pre-Shared Key (PSK) for the hearing assistive device 1, and the two pre-master keys or the random numbers, $RN_{HA}$ and $RN_S$, as input. The Internet Engineering Task Force (IETF) has developed Internet standards in the Transport Layer Security (TLS) Protocol for deriving the pre-master keys from Pre-Shared Key (PSK) and for deriving the master-secret (K) and encryption keys.

Hereby the Pre-Shared Key (PSK) may be kept secure as the keys are not used directly or transmitted in between the devices. Instead, a master-secret (K), which is a temporary key, is derived and used in the actual cryptographic operations.

Low-level cryptographic algorithms are frequently used to build cryptographic protocols for computer-based security systems and may be applied with the current invention, and these routines may include one-way hash functions and encryption functions. The embodiment explained employs symmetric-key algorithms for cryptography and uses the same cryptographic keys for both encryption of plaintext and decryption of ciphertext.

The master-secret (K) calculated above is unique for each hearing assistive device 1. The master-secret (K) is known on the programming-rights-management server 3 and in the hearing assistive device 1. The master-secret (K) is not known in the fitting program running on the programming device 2 or in the app (application software adapted to run on smartphones or other mobile devices) on the personal communication device 6 serving as gateway to the Internet 5.

Following the successful generation of the master-secret (K), the fitting program initiates a feature certificate validation or upgrade. The fitting program running on the programming device 2 has been granted a certificate defining editing rights (read/write) for settings in one or more hearing assistive devices 1. In one embodiment, the feature certificate is a description of which addresses (register/EEPROM) that may be accessed and/or edited. The feature certificate may be seen as a whitelist of register/EEPROM addresses which can be read and/or modified. These register/EEPROM addresses are adapted to receive the settings controlling the features of the hearing assistive device 1, including alleviating a hearing loss by personalized amplification, or controlling the overall architecture of the hearing assistive device 1. The editing rights are specified in a feature certificate specific for each hearing assistive device 1. The feature certificate may change over time managed by the programming-rights-management server 3, why the feature certificate is therefore denoted by its version. The programming-rights-management server 3 keeps track on valid versions of the feature certificate and issues new feature certificates.

The programming device 2 sends, as shown in FIG. 4c, a ApplyCert(DevId,$\{SP\}_K$) message 44 requesting permission to program the hearing assistive device 1 based on a programming rights certificate. The message 43 is sent to the hearing assistive device 1 and includes a unique identity (DevId) of the requesting programming device 2.

Furthermore, the message 43 contains Session Parameters (SP) in cleartext including several of the following elements: the unique identity (HaID) of the hearing assistive device 1, the feature certificate (listing the features to be programmed), the version of the feature certificate, the firmware version for the hearing assistive device 1 and a nonce. The Session Parameters (SP) in cleartext have been issued by the programming-rights-management server 3, and is provided with a message authentication code (using the key K) for the Session Parameters (SP) appended.

In cryptography, a nonce is an arbitrary number that often may be used only once. The nonce is calculated by means of the security elements stored in the hearing assistive device 1, including the private key, and may include a timestamp to ensure exact timeliness, though this requires clock synchronization between the entities. The nonce is often a random or pseudo-random number issued in an authentication protocol to ensure that past communications cannot be reused in future replay attacks.

Upon reception of the ApplyCert(DevId,$\{SP\}_K$) message 44, the hearing assistive device 1 already knowing the master-secret (K) decrypts the message 44 and verifies that the message is authentic by checking the validity of the nonce by means of its security elements. If master-secret (K) and the nonce are valid, the message is deemed to be authentic and the hearing assistive device 1 commits a new nonce and activates the received feature certificate. Otherwise the hearing assistive device 1 invalidates the pending nonce. The result of the evaluation is communicated back to the programmer 2 in an Acknowledgment message 45.

If the programming device 2, based upon the received Acknowledgment message 45, identifies a need for a version of the feature certificate currently not available, the programming device 2 requests, in a UpdateFeatCert(DevID) message 46, the hearing assistive device 1 to initiate the establishment of the master-secret (K) as explained with reference to FIG. 4b and to request a required version of the feature certificate. By including its unique identity (DevId) code in the UpdateFeatCert(DevID) message 46, the programming device 2 identifies itself.

Upon receiving the UpdateFeatCert(DevID) message 46, the hearing assistive device 1 generates a nonce for programming device 2 based on the unique identity (DevId) code. Once the master-secret (K) has been established, the hearing assistive device 1 prepares and sends ReqNewFeatCert($\{UFC\}_K$) message 47 to the programming device 2. $\{UFC\}_K$ denote a text string, UFC, in cleartext with the master-secret (K) as message authentication code. The UFC text string includes among others the unique identity (HaID) of the hearing assistive device 1, an identification of the required version of the feature certificate, and the nonce for programming device 2.

The programming device 2 receives the ReqNewFeatCert ($\{UFC\}_K$) message 47 but is unable to decrypt the $\{UFC\}_K$ element. However in order to obtain the required feature certificate, the programming device 2 prepares and sends ReqFeatCert(SWver, {UFC}$_K$) message 48 to the programming-rights-management server 3. The programming device 2 adds information about the programming software running on the device to the encrypted {UFC}$_K$ text string in the ReqFeatCert(SWver, {UFC}$_K$) message 48.

When receiving the ReqFeatCert(SWver, {UFC}K) message 48 requesting an updated feature certificate, the programming-rights-management server 3 looks up the master-secret (K) for the HaID. The programming-rights-management server 3 may also check the MAC address (also called a physical address which is a unique identifier assigned to network interfaces for communications on the physical network segment) of a requesting device. If the check is ok, the programming-rights-management server 3 looks up the permitted feature certificate for the programming device 2 in the upcoming programming session with the hearing assistive device 1. The permitted feature certificate depends on the hardware, software and firmware of the programming device 2 and the hearing assistive device 1. The permitted feature certificate furthermore depends on the types of programming the operator of the programming device 2 is permitted to carry out.

A hearing care professional will be permitted to set control parameters of the hearing assistive device 1 for alleviating a hearing loss by personalized amplification. Other control parameters control the overall architecture of the hearing assistive device 1 and affects the price point of the hearing assistive device 1; either on subscription basis or as a part of the sale of the hearing assistive device 1.

The programming-rights-management server 3 prepares and sends a Return({PFC}$_K$) message 49 to the programming device 2. {PFC}$_K$ denotes a text string, PFC, in cleartext with the master-secret (K) as message authentication code, and may be a signed or a ciphered element. The PFC text string includes among others the unique identity (HaID) of the hearing assistive device 1, the permitted feature certificate for carrying out the desired operation, and the nonce for programming device 2.

Upon reception of the Return({PFC}$_K$) message 49, the programming device 2 sends a a DevID({PFC}$_K$) message 50 to the hearing assistive device 1. The DevID({PFC}$_K$) message 50 contains the signed or the ciphered element {PFC}$_K$. The programming device 2 does not know the master-secret (K) and is therefore not able to moderate the signed or the ciphered element {PFC}$_K$.

When the hearing assistive device 1 receives the DevID ({PFC}$_K$) message 50 including the signed or the ciphered element {PFC}$_K$, it is able to moderate the signed or the ciphered element {PFC}$_K$ by means of its embedded decryption algorithms and the availability of the master-secret (K). The hearing assistive device 1 verifies that the nonce contained in the signed or the ciphered element {PFC}$_K$ matches the nonce in the signed or the ciphered element {UFC}$_K$ contained in the ReqNewFeatCert({UFC}$_K$) message 47. The validity of the master-secret (K) and nonce is used to verify the validity of the DevID({PFC}$_K$) message 50 and the permitted feature certificate contained therein. If the permitted feature certificate is successfully authenticated the new nonce is committed and the received feature certificate is stored and activated.

Based on the permitted feature certificate stored in the hearing assistive device 1, the programming device 2 is now able to set up a programming session 51, in which the programming device 2 reads from and writes in predefined parts of the memory (e.g. specific registers) of the hearing assistive device 1.

In one embodiment, the hearing care professional will be permitted to set control parameters of the hearing assistive device 1 for alleviating (amplification, transposing of frequency bands, speech intelligibility, etc.) a hearing loss by personalized amplification. In another embodiment, the hearing care professional may set control parameters controlling the overall architecture (adjusting the number of processing bands, manipulating the cross-over frequency between bass and treble, etc.) of the hearing assistive device 1, and thereby affect its selling price. In yet another embodiment, the hearing care professional may set control parameters activating or deactivating features (tinnitus therapy, wind noise reduction, etc.) of the hearing assistive device 1 being available on subscription basis. Hereby, the system will be effective against fraud while legal refurbishment will still be permitted.

When the programming session has been completed, the session related elements like the nonce and master-secret (K) become invalidated and needs to be re-established before a new programming session can be set up.

Figure 5:
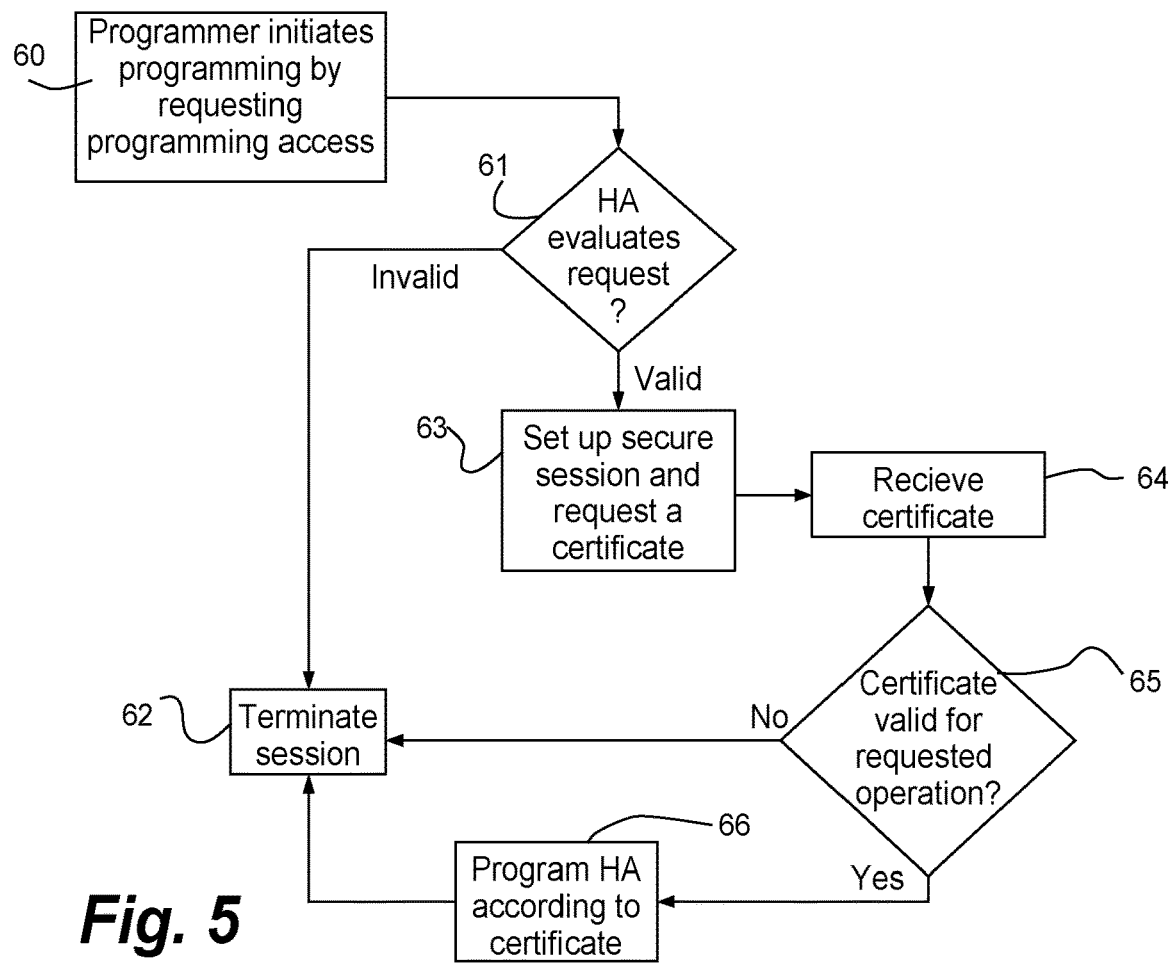
FIG. 5 illustrates a flow chart for controlling the access to a programming interface of a hearing assistive device according to one aspect of the invention.

When the hearing care professional or the audiologist, step 60 in FIG. 5, starts a programming session (remote fitting) with the hearing assistive device 1, write access from a programming device 2 to the hearing assistive device 1 is requested by sending the ApplyCert(DevId,{SP}$_K$) message 44. In step 61, the hearing assistive device 1 checks whether the received message is coming from trustworthy source by checking whether the nonce present in ApplyCert(DevID, {SP}$_K$) message 44 is valid or invalid. If the nonce is invalid, the hearing assistive device 1 terminates the session in step 62. If the nonce is valid, the hearing assistive device 1 sets up a secure session in step 63 by sending the ReqNewFeatCert({UFC}$_K$) message 47 containing a signed or a ciphered element and requesting a programming rights permission list to the access rights management server 3.

The programming-rights-management server 3 then generates the feature certificate or the programming rights permission list. Once the hearing assistive device 1 in step 64 receives the DevID({PFC}$_K$) message 50 including the signed or the ciphered element {PFC}$_K$, it is able to moderate the signed or the ciphered element {PFC}$_K$ by means of its embedded decryption algorithms and the availability of the master-secret (K). The hearing assistive device 1 verifies in step 65 that the nonce contained in the signed or the ciphered element { PFC}$_K$ matches the nonce in the signed or the ciphered element {UFC}$_K$ contained in the ReqNewFeatCert({UFC}$_K$) message 47. The contained feature certificate or the programming rights permission list is hereby authenticated. If the feature certificate cannot be authenticated the session is terminated at step 62.

Once the feature certificate has been authenticated that the programming device 2 is permitted to program the hearing assistive device 1, the programming device 2 starts in step 66 to transfer data to the hearing assistive device 1 according to the authenticated feature certificate. Hereafter the programming session is terminated when data writing has been completed.

According to one embodiment of the invention a secure session is established by means of a set of private keys held by the programming-rights-management server 3 and a hearing assistive device 1, and the secure session is applied for communicating the access rights for the programming device 2 from the programming-rights-management server 3 to the hearing assistive device 1.

Figure 6:
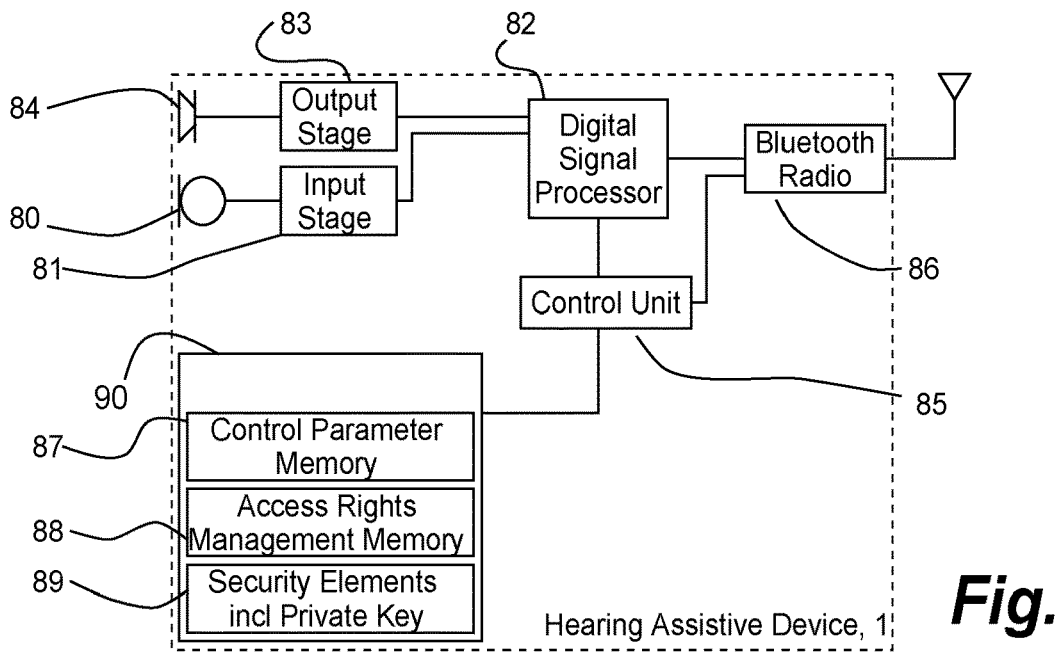
FIG. 6 schematically illustrates a hearing assistive device according to an embodiment of the invention.

FIG. 6 shows the hearing assistive device 1 of the type shown with reference to FIGS. 1-3. The hearing assistive device 1 comprises an input transducer 80 for picking up the acoustic sound and converting it into electric signals. The electric signals from the input transducer 80 are amplified and digitized in an input stage 81, and the digital signal is led to a Digital Signal Processor (DSP) 82 responsible for the signal processing for alleviating a hearing loss by amplifying sound at frequencies in those parts of the audible frequency range where the user suffers a hearing deficit. The Digital Signal Processor (DSP) 82 is a specialized microprocessor with its architecture optimized for the operational needs of the digital audio signal processing with focus on power efficiency. DSP algorithms carries out a large number of mathematical operations repeatedly on a series of data samples. Signals are constantly converted from analog to digital, manipulated digitally, and then converted back to analog form with as low latency as possible. The processed, digital signal from the Digital Signal Processor (DSP) 82 is via an output stage 83 led to an output transducer 84 reproducing the amplified and conditioned signal for the hearing aid user.

The hearing assistive device 1 further includes a short-range radio 86 for providing an inter-ear communication channel with another hearing assistive device 1 and a communication channel with external devices likes personal communication devices (e.g. smartphones) and broadcast transmitters (e.g. television audio streamers). The short-range radio 86 may preferably be based on the Bluetooth™ Low Energy protocol.

The hearing assistive device 1 furthermore includes a control unit 85 controlling the overall operation of the hearing assistive device 1. The control unit 85 controls the communication between the short-range radio 86 and the Digital Signal Processor (DSP) 82 when the short-range radio 86 receives or transmits audio streams. The control unit 85 also controls reading from and writing to a memory 90. The memory 90 is shown as one unit but it may include a volatile element as working memory, and a non-volatile element containing program code for execution.

The memory 90 furthermore includes a control parameter memory 87 for storing the control parameters of the hearing assistive device 1 for alleviating a hearing loss by personalized amplification, for controlling the architecture of the hearing assistive device 1, and for enabling and disabling of add-on features of the hearing assistive device 1. Only authorized external devices are permitted to read from and write to the control parameter memory 87.

The memory 90 also includes a memory 89 containing security elements including the private key and the unique identification (HaID) of the hearing assistive device 1. The memory 89 is One-Time Programmable (OTP) and is a form of digital memory where the setting of each bit is locked by a fuse or anti-fuse. The data in them is permanent and cannot be changed. The data may preferably be permanently entered during the assembling of the hearing assistive device 1.

Finally, the memory 90 also includes an access rights manager memory 88 in which the permitted feature certificate and version information is stored. Furthermore, the access rights manager memory 88 contains temporary security elements as the nonce and the Random Number. The embedded encryption and decryption algorithms may also be stored in the access rights manager memory 88.

The control unit 85 also acts as communication manager managing the wireless communication via the short-range radio 86. Therefor it is the control unit 85 that sends the current connection information for the hearing assistive device 1 to the control server 4 when trigged by an event, e.g. a connection being established via a gateway to the Internet.

Upon reception of a programming request from the programming device 2, the control unit 85 is acting as security manager and generates a nonce for programming device 2 based on the unique identity (DevID) code and the embedded encryption algorithms and sends a first message (the ReqNewFeatCert($\{UFC\}_K$) message 47) to a programming-rights-management server 3.

When the control unit 85, while still acting as security manager, receives a second message (the DevID($\{PFC\}_K$) message 50) containing a programming rights permission list (feature certificate) from the programming-rights-management server 3, it verifies the authentication of the received programming rights permission list by means of the nonce and the embedded decryption algorithms. If the programming rights permission list (feature certificate) is deemed to be authentic, the control unit 85 sets up a programming session 51 with the programming device 2 based upon the programming rights permission list, and the control unit 85 terminates the programming session when data writing has been completed. During the session the programming device 2 is able to read from and write to registers and addresses in the control parameter memory 87 according to the specification in the programming rights permission list (feature certificate). Once the session is completed, temporary security elements stored in the access rights manager memory 88 are deleted.

The invention claimed is:

1. A method for programming a hearing assistive device, including:
   initiating the programming session by requesting write access from a programming device to the hearing assistive device;
   sending, in response to the request, a first message from the hearing assistive device to a programming-rights-management server;
   generating, in the programming-rights-management server, a programming rights permission list;
   sending a second message containing the programming rights permission list from the programming-rights-management server to the hearing assistive device;
   transferring programming data in a programming session from the programming device to the hearing assistive device;
   writing the received programming data as control data sets permitted according the programming rights permission list received from the programming-rights-management server; and
   terminating the programming session once data writing has been completed.

2. The method according to claim 1, wherein the hearing assistive device embeds a signed or encrypted element into the first message by means of security element, and wherein the programming right management server embeds a signed or encrypted element into the second message by means of security element, whereby devices relaying the first and/or second messages will not be able to modify the one or more signed or encrypted elements.

3. The method according to claim 2, wherein the programming right permission list is included in the signed or encrypted element of the second message.

4. The method according to claim 1, wherein the programming device is acting as gateway for the hearing assistive device to the Internet and is relaying the first and second messages exchanged between the hearing assistive device and the programming-rights-management server.

5. The method according to claim 1, and further comprising calculating of a first nonce based upon a private key stored in the hearing assistive device and including the first nonce in the first message.

6. The method according to claim 5, and further comprising verifying, in the programming-rights-management server, the authenticity of the first message by means of the first nonce.

7. The method according to claim 1, and further comprising calculating of a second nonce in the programming-rights-management server and including the second nonce in the second message.

8. The method according to claim 7, and further comprising verifying, in the hearing assistive device, the authenticity of the second message by means of the second nonce.

9. The method according to claim 1, wherein the programming rights permission list contains a whitelist of memory addresses with associated access rights.

10. The method according to claim 9, wherein the whitelist is only valid for the programming session for which it was created.

11. The method according to claim 1, wherein the secure access is established by means of symmetric-key algorithms as the programming-rights-management server, and the hearing assistive device holds a set of private keys.

12. A hearing assistive device having a programming interface providing secure access to programming data stored in the hearing assistive device, and a communication manager managing communication over a wireless connection, wherein
the communication manager, when receiving a write access request from a programming device, sends a first message to a programming-rights-management server;
the communication manager, when receiving a second message containing a programming rights permission list from the programming-rights-management server in response to the message sent, sets up a programming session with the programming device based upon the programming rights permission list; and
the communication manager terminates the programming session once data writing has been completed.

13. The hearing assistive device according to claim 12, wherein the first message is requesting the programming-rights-management server to provide a programming rights permission list.

14. The hearing assistive device according to claim 13, wherein the programming rights permission list contains whitelist of memory addresses with associated access rights for the programming device regarding data stored in the hearing assistive device.

15. The hearing assistive device according to claim 12, wherein the programming interface is adapted for exchanging data between the hearing assistive device and the programming device.

16. The hearing assistive device according to claim 12 and being adapted for using the programming device as gateway to the Internet, whereby the programming device is relaying the messages exchanged between the hearing assistive device and the programming-rights-management server.

17. The hearing assistive device according to claim 12, wherein a security manager is adapted for calculating a first nonce based upon a private key stored in a memory, and wherein the programming interface includes the first nonce in the first message.

18. The hearing assistive device according to claim 17, wherein the security manager is further adapted for verifying the authenticity of the second message by means of a second nonce contained in the second message.

19. The hearing assistive device according to claim 14, wherein the whitelist is only valid for the programming session for which it was created.

20. The hearing assistive device according to claim 12, wherein the secure access is established by means of symmetric-key algorithms as the programming-rights-management server, and the hearing assistive device holds a set of private keys.

21. A programming system for programming a hearing assistive device, and including a programming device and a programming-rights-management server, wherein:
the programming device is adapted to initiate a programming session by requesting write access to the hearing assistive device, the hearing assistive device is adapted to send a first message, in response to the request, to the programming-rights-management server;
the programming-rights-management server is adapted to generate a programming rights permission list, and to send the programming rights permission list in a second message to the hearing assistive device; and
the programming device is adapted to transfer programming data in the programming session to the hearing assistive device, the hearing assistive device is adapted to write the received programming data as control data sets permitted according the programming rights permission list received from the programming-rights-management server;
wherein the programming device is adapted to terminate the programming session once data writing has been completed.

22. The programming system according to claim 21, wherein the programming device is adapted to act as gateway for the hearing assistive device to the Internet and to relay the first and second messages exchanged between the hearing assistive device and the programming-rights-management server.

23. The programming system according to claim 21, where the first message includes a first nonce calculated by means of a private key stored in the hearing assistive device, and wherein the programming-rights-management server verifies the authenticity of the first message by means of the first nonce.

24. The programming system according to claim 21, wherein the programming-rights-management server calculates a second nonce and includes the second nonce in the second message.

25. The programming system according to claim 21, wherein the programming rights permission list contains a whitelist of memory addresses with associated access rights.

26. The programming system according to claim 25, wherein the whitelist is only valid for the programming session for which it was created.

* * * * *